United States Patent
Vamvas

(10) Patent No.: US 10,060,408 B2
(45) Date of Patent: Aug. 28, 2018

(54) ECCENTRICALLY ROTATING MASS TURBINE

(71) Applicant: Vassilios Vamvas, Bedford, MA (US)

(72) Inventor: Vassilios Vamvas, Bedford, MA (US)

( * ) Notice: Subject to any disclaimer, the term of this patent is extended or adjusted under 35 U.S.C. 154(b) by 0 days.

(21) Appl. No.: 15/193,104

(22) Filed: Jun. 26, 2016

(65) Prior Publication Data
US 2017/0009734 A1    Jan. 12, 2017

Related U.S. Application Data

(60) Provisional application No. 62/185,627, filed on Jun. 28, 2015, provisional application No. 62/210,455, filed on Aug. 27, 2015.

(51) Int. Cl.
| F03B 13/22 | (2006.01) |
| F03B 13/16 | (2006.01) |
| H02K 7/18  | (2006.01) |
| B63B 35/44 | (2006.01) |

(52) U.S. Cl.
CPC .............. *F03B 13/22* (2013.01); *F03B 13/16* (2013.01); *H02K 7/1823* (2013.01); *H02K 7/1853* (2013.01); *B63B 2035/4466* (2013.01); *F05B 2220/32* (2013.01); *F05B 2220/706* (2013.01); *F05B 2240/93* (2013.01); *Y02E 10/38* (2013.01)

(58) Field of Classification Search
CPC .................. F03B 13/22; F03B 13/16
See application file for complete search history.

(56) References Cited

U.S. PATENT DOCUMENTS

| 937,712 | A | 10/1909 | McFarland | |
| 3,231,749 | A | 1/1968 | Hinck | |
| 4,266,143 | A * | 5/1981 | Ng | F03B 13/20 290/42 |
| 4,352,023 | A * | 9/1982 | Sachs | F03B 13/20 290/42 |
| 4,599,858 | A * | 7/1986 | La Stella | F03B 13/186 290/42 |
| 4,843,250 | A | 6/1989 | Stupakis | |
| 6,876,095 | B2 | 4/2005 | Williams | |
| 7,375,436 | B1 | 5/2008 | Goldin | |
| 7,453,165 | B2 * | 11/2008 | Hench | F03B 13/20 290/42 |
| 7,484,460 | B2 | 2/2009 | Blum et al. | |
| 7,629,704 | B2 | 12/2009 | Hench | |
| 7,934,773 | B2 | 5/2011 | Boulais et al. | |
| 7,989,975 | B2 * | 8/2011 | Clement | F03B 13/20 290/53 |
| 8,614,521 | B2 * | 12/2013 | Babarit | F03B 13/20 290/42 |
| 8,915,077 | B2 | 12/2014 | Paakkinen | |
| 2004/0041401 | A1 * | 3/2004 | Trenchev | F03G 3/00 290/1 R |

(Continued)

*Primary Examiner* — Sean Gugger

(57) ABSTRACT

A turbine comprises a shaft (20), a mass (10) eccentrically mounted for rotation about shaft (20), having its center of gravity at a distance from the shaft (20) and a motion base (15). Motion base (15) rigidly supports the shaft (20), and is configured for moving the shaft (20) in any direction of at least two degrees of movement freedom, except for heave. A floating vessel-turbine (120), encloses entirely the eccentrically rotating mass (10) and the motion base (15). The turbine converts ocean wave energy into useful energy, very efficiently.

8 Claims, 8 Drawing Sheets

(56) References Cited

U.S. PATENT DOCUMENTS

| | | | |
|---|---|---|---|
| 2009/0041575 A1* | 2/2009 | Morch | F03B 13/145 |
| | | | 415/124.1 |
| 2011/0265468 A1* | 11/2011 | Paakkinen | F03B 13/20 |
| | | | 60/499 |
| 2012/0102938 A1 | 5/2012 | Bums et al. | |
| 2012/0227486 A1 | 9/2012 | Gregory | |
| 2014/0353973 A1 | 12/2014 | Chen | |
| 2015/0000263 A1* | 1/2015 | Foster | F03B 13/16 |
| | | | 60/504 |
| 2015/0123406 A1 | 5/2015 | Paakkinen | |

* cited by examiner

ECCENTRICALLY ROTATING MASS TURBINE

CROSS-REFERENCE TO RELATED APPLICATIONS

This application claims the benefit of U.S. Pat. No. 8,723,350, U.S. Pat. No. 8,841,822, U.S. provisional patent application Ser. No. 62/185,627 and U.S. provisional patent application Ser. No. 62/210,455 submitted by the same inventor and incorporated herein by reference in their entirety.

BACKGROUND

The following is a tabulation of some prior art that presently appears relevant:

| U.S. Patents | | | |
|---|---|---|---|
| Pat. No. | Kind Code | Issue Date | Patentee |
| 8,915,077 | B2 | 2014 Dec. 23 | Paakkinen |
| 8,887,501 | B2 | 2014 Nov. 18 | Paakkinen |
| 8,739,512 | B2 | 2014 Jun. 3 | Kanki |
| 8,614,521 | B2 | 2013 Dec. 24 | Babarit et al. |
| 8,456,026 | B2 | 2013 Jun. 4 | Cleveland |
| 8,269,365 | B2 | 2012 Sep. 18 | Clement et al. |
| 8,046,108 | B2 | 2011 Oct. 25 | Hench |
| 7,989,975 | B2 | 2011 Aug. 2 | Clement et al. |
| 7,934,773 | B2 | 2011 May 3 | Boulais et al. |
| 7,906,865 | B2 | 2011 Mar. 15 | Minguela et al. |
| 7,484,460 | B2 | 2009 Feb. 3 | Blum et al. |
| 7,453,165 | B2 | 2008 Nov. 18 | Hench |
| 7,375,436 | B1 | 2008 May 20 | Goldin |
| 7,003,947 | B2 | 2006 Feb. 26 | Kanki |
| 6,888,262 | B2 | 2005 May 3 | Blakemore |
| 6,876,095 | B2 | 2005 Apr. 5 | Williams |
| 6,095,926 | | 2000 Aug. 1 | Hettema et al. |
| 6,027,342 | | 2000 Feb. 22 | Brown |
| 4,843,250 | | 1989 Jun. 27 | Stupakis |
| 4,352,023 | | 1982 Sep. 28 | Sachs et al. |
| 4,266,143 | | 1981 May 5 | Ng |
| 3,577,655 | | 1971 May 4 | Pancoe |
| 3,231,749 | | 1966 Jan. 25 | Hinck |
| 937,712 | | 1909 Oct. 19 | McFarland |

| Pat. No. | Kind Code | Issue Date | Applicant |
|---|---|---|---|
| U.S. Patent applications | | | |
| 2015/0123406 | A1 | 2015 May 7 | Paakkinen |
| 2012/0001432 | A1 | 2012 Jan. 5 | Clement et al. |
| 2011/0012443 | A1 | 2011 Jan. 20 | Powers |
| WO Patent applications | | | |
| WO2012103890 | A1 | 2012 Aug. 9 | Jan Olsen |
| WO2010034888 | A1 | 2010 Apr. 1 | Paakkinen |

Field of Use

The present invention relates to turbines which convert a prime source of power to powerful rotation and more specifically to turbines which utilize gravitational and inertial forces applied on an eccentrically rotating mass.

Description of the Prior Art

In prior art, a rotator eccentrically mounted for rotation on an upright shaft and having its center of gravity at a distance from the shaft, has been used to produce electrical power utilizing ocean waves as a prime mover. Typically, a hollow floating structure, buoy or vessel provides the base where the upright shaft is supported. In most cases the rotating mass or pendulum having a weight attached at its distant end from the shaft is completely enclosed in the floating base for protection from the sea water. The waves rock the floating structure imparting the motion to the shaft, where the mass is mounted for rotation. The upright shaft moves from its position, forward and backward, or left and right or up and down in a linear or rotational direction causing the rotational displacement of the eccentrically rotating mass, which moves to a new position due to gravitational and inertial forces. Unfortunately, most of the times, the mass oscillates and only occasionally it rotates. Full rotations are difficult to succeed due to the randomness of the wave parameters. One wave may set the mass in rotation and the next may stop it, by generating rotation preventing forces. Devices, in prior art, aimed to avoid rotation preventing forces and "help" the mass into full rotations. U.S. Pat. No. 8,915,077 and patent application no. 2015/0123406 disclose floating structures of particular designs including a fixed upright shaft and a rotator. These structure have very specific designs and substantially large dimensions, in relation to the rotating mass. They are designed to produce beneficial inclinations and corresponding forces to "help" the rotator rotate in full circles. However, the stochasticity of the wave train is still not avoided, rocking the vessel, stochastically, and relaying corresponding movement to the shaft. WO2010034888 and U.S. Pat. No. 7,375,436 describe devices that aim to "help" the mass succeed full rotations, in different ways. They include gyroscopes, powered continuously to high rpm, in order to provide "the extra push" to the mass and bring it closer to a full rotation, through precession torque. This "gyroscopic push" constantly consumes power and its effect may still not be potent enough to overcome undesirable gravitational and/or electrical load based, rotation preventing forces.

U.S. Pat. No. 7,453,165 describes a device for harnessing the power of ocean waves through a buoy, which supports a pendulum mounted on a vertically oriented central shaft, fixed on the body of the buoy to directly receive its movements. Again, the buoy imparts all desirable and undesirable movements to the shaft.

The undesirable or rotation preventing motion of a vessel occurs when an instant wave moves the vessel, and inevitably the shaft, bringing it to a position that creates an "up-hill" for the rotating mass. Even worse is when the wave arrives at a time that the mass is in rotational deceleration "running out" of a previously developed angular momentum.

The ideal condition for the mass rotation is to always have a "down-hill" ahead. It is an object of the present disclosure to generate "down-hill" conditions, most of the times.

The "down-hill" conditions occur when the shaft provides an inclination to the mass, which generates a beneficial for the rotation torque, due to gravity. This torque is at maximum, when the lowest point of a "down-hill" is 90° ahead of the current position of the mass. Other forces, such as inertial forces, generated from the movement of the shaft, in multiple translational or rotational directions, may also benefit the rotation.

U.S. Pat. No. 4,843,250 describes a buoyant vessel of a circular form with a pivot shaft of a lever arm having a weight at the end thereof. The weight is freely rotatable in either direction through 360 degrees. The lower end of the shaft is coupled to a piston type hydraulic pump, which draws fluid from a reservoir and activates a hydraulic motor to create electricity. U.S. Pat. No. 8,456,026 describes a gyroscopic device which can be used as a power generator utilizing natural wind or wave motion to induce processional rotation in a gyroscopic device. Processional rotation is also the object of U.S. Pat. No. 4,352,023, No. 7,003,947 and No. 7,375,436. U.S. Pat. No. 6,876,095 describes a generator which produces electrical power. The apparatus includes a main shaft with a weight element coupled to an end of the shaft. The weight is supported at a distance from the axis of the shaft to generate angular momentum upon movement of the end of the shaft on a cyclical arc path. This path belongs to one plane. A tangential force is applied to the shaft generated by a motor. The shaft is restricted to rotate only in one plane and about only one axis, being limited in contributing additional forces, during a full rotation, that would make the weight's rotation more powerful and substantially increase its power generation capability.

A floating vessel, disposed to ocean wave activity, can move in up to six degrees of movement freedom. These are three translations, forward/backward (surge or Translation on the x-axis: $T_x$), left/right (sway or Translation on the y-axis: $T_y$), up/down (heave or Translation on z-axis: $T_z$), and three rotations, pitch (rotation about the forward/backward axis: $R_x$), roll (rotation about the left/right axis: $R_y$) and yaw (rotation about the up and down axis: $R_z$).

Flight simulators or amusement ride capsules supported by motion bases can move in up to six degrees of freedom, as well. It is known in the art, that motion bases can be classified according to whether the motion can be carried out by independent motion producing stages, stacked upon each other, called "stacked" motion bases, or by a single platform, supported on a plurality of actuators, rams, or "legs", utilizing the principles of parallel kinematics, called "synergistic" motion bases.

The independent motion stages in a "stacked" motion base can be implemented by stacking simple machines such as linear slides, pivots and swivels, which are activated independently, by a corresponding actuator. A linear slide, for example, may include a base, straight-line bearings on the base, a platform that moves in a straight line along the bearings and actuators such as hydraulic cylinders or sprocket and chain, which when activated can provide a translational motion to a body attached on its platform. Similarly, a pivoting platform can provide a rotational motion.

The synergistic motion base consists of a part securely fixed and a part that can be linearly moved, through a limited distance or rotated through a limited angle. The movement of the one part of the base relative to the other is usually produced by extensible actuators or rams.

A motion base is also classified according to the number of degrees of movement freedom, or simply degrees of freedom, or the directions in which it can move. The Stewart platform, well known in the art, is a synergistic motion base which can provide six degrees of freedom.

Actuators include hydraulic rams, electrical actuators, such as rotary electric motors without or with a gearing system, which can impart high torque etc. Recently developed actuators include efficient pneumatic rams and electromagnetic rams, a form of dual action linear motor in which a piston moves freely in a cylinder like a hydraulic cylinder.

U.S. Pat. No. 7,484,460 claims a decouplable, movable track section of an amusement ride path and "a motion base supporting the movable track section and the motion base being configured for moving the movable track section in a direction along any of three coordinate axes, or any combination thereof, while also being configured for carrying out pitch, roll and yaw motions with the movable track section when the movable track section is decoupled."

SUMMARY

A turbine comprises a shaft being vertical in non-operative position, a mass eccentrically mounted for rotation about and in a perpendicular plane to the shaft, having its center of gravity at a distance of the shaft and a motion base rigidly supporting the shaft, being configured for moving the shaft in any of the directions of at least one set of two degrees of movement freedom, selected from the following degrees of movement freedom: pitch, roll, yaw, surge and sway.

The turbine provides with embodiments functional both in land and ocean. Prime movers such as actuators or even a prime source itself, such as ocean waves, provide with motion which activates a "stacked" or a "synergistic" motion base. A control system optimizes motion base's movements for the creation of beneficial gravitational and/or inertial forces to the eccentrically rotating mass.

LIST OF FIGURES

DETAILED DESCRIPTION

Figure 1:
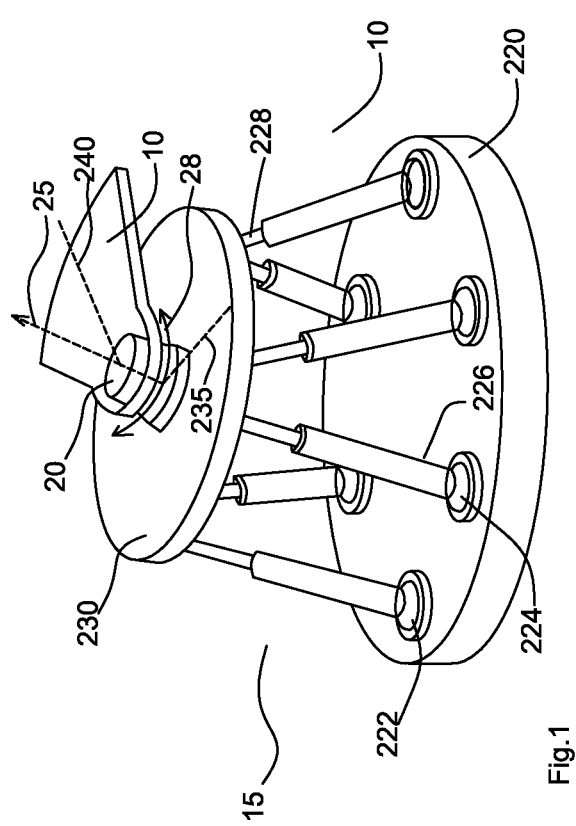
FIG. 1 shows a perspective view of a preferred embodiment of the turbine utilizing the eccentrically rotating mass at an instant of a beneficial inclination.

The present disclosure describes a turbine, utilizing a mass, eccentrically mounted for rotation, about a shaft in a perpendicular to shaft's main axis, plane. The mass has its center of gravity at a distance from the shaft. The mass rotation is facilitated with the use of bearings. The shaft, in one preferred embodiment, has a vertical non-operative position and is supported rigidly, not to rotate, on a moving platform of a motion base. In operation, the motion base provides to the shaft translational and/or rotational movements at a limited range of motion, causing the shaft to deviate from its initial vertical position. In another, preferred, embodiment the shaft is supported by a pivoting platform supported by a pivot, providing pivoting to the pivoting platform about a horizontal axis. The pivot is fixed on a second platform which limits the pivoting range of the pivoting platform to a small angle. The second platform is a motion base of the "synergistic" or "stacked" type. Shaft's deviation from the vertical position generates gravitational forces on the mass, which cause its rotation. Also, acceleration, deceleration and stopping of the shaft, generates inertial forces. The turbine disclosed can utilize both gravitational and inertial forces to have its mass rotate.

The turbine described, herein, can be used in land or offshore on a dedicated vessel or other ships, near-shore under the surface of the water or on shore, with great efficiencies. A control system with sensors may also be included to optimize the mass' angular momentum, by controlling the gravitational and/or inertial forces provided by the shaft to the mass. In ocean applications the control system, in addition, monitors the characteristics of the current wave, and if needed, the upcoming wave's as well, by having sensors disposed on the ocean surface, in proximity to the vessel-turbine. The control system monitors the mass' rotational parameters, such as angular velocity and momentum as well as the current and/or the upcoming wave characteristics, such as height, period and speed. It also monitors the upcoming possible shaft position, such as elevation, angle, rotational or translational speed or acceleration depending on the characteristics of the monitored waves. The load of turbine from compressor applications or electrical generation, is also monitored. The ocean control system compensates undesirable upcoming "up-hills" and creates the conditions for "down-hills" instead, by moving the shaft's position, accordingly.

Multiple controlled movements of the shaft can benefit the mass' rotation. However, at minimum, the movement of the shaft in the directions of at least two degrees of freedom can generate sufficient forces to the shaft for a powerful mass rotation, substantially more beneficial from the mass rotation that would have been derived by providing forces to move the shaft in the directions of only one degree of freedom. For example, it is more beneficial to surge and roll the shaft, within the same cycle, instead of only applying one of the two rotations. Similarly, it is more beneficial to provide pitch and roll or surge and pitch to the shaft, instead of only one movement from the pair of movements, mentioned, per cycle. Movements in the directions of heave would require substantial inclinations of the shaft to be beneficial, and is not being examined in the present disclosure. Below, the beneficial combinations by two are examined:

1) All combinations, by two, of $R_x$, $R_y$, $R_z$. Pitch and Roll can create "down-hills" which "help" the rotating mass' angular momentum. When a "down-hill" travel of the mass is over, the "difficulty of an up-hill", for the rotation, may begin. Yaw rotational motion applied to the mass can provide the additional "push", to add to the mass' angular momentum and "help" it overcome this "difficulty".

2) $T_x$-$R_y$, $T_y$-$R_x$, $T_x$-$R_x$, $T_y$-$R_y$. Similarly to the above, Surge can fortify the rotating mass to overcome an "up-hill" created by Roll and Sway can "help" overcome an "up-hill" created from Pitch. Similarly, Surge and Pitch provide more angular momentum, through inertial and gravitational forces, in comparison to applying only one them. The same holds for Sway and Roll.

3) All combinations of $T_x$, $T_y$, $R_z$. Surge and Sway can maintain a powerful angular momentum of a mass through inertial forces, without necessarily needing a "down-hill" benefit. Of course, a "down-hill" benefit can be added to them as an extra "help", but this is the "at least two" list! Similarly, Yaw, applied in combination with Surge or Sway, adds an additional benefit to the mass rotation.

Overall the beneficial combinations are as follows: pitch-roll, pitch-yaw, roll-yaw, surge-roll, sway-pitch, surge-pitch, sway-roll, surge-sway, surge-yaw, sway-yaw. These, though, are all the possible combinations by two, from all beneficial degrees of movement freedom.

Referring now to the drawings in which like reference numerals are used to indicate the same related elements, FIG. 1 shows a preferred embodiment of the turbine. It shows an eccentric mass 10, mounted for rotation, indicated by arrows 28. Mass 10 is freely rotatable in either direction through 360 degrees about shaft 20 and its main axis 25. The rotation is facilitated by bearings (not shown). The rotational plane of mass 10, about shaft 20, is perpendicular to shaft's main axis 25. The center of gravity of mass 10 is at a distance from shaft 20.

Shaft 20 receives motion from motion base 15. Motion base 15 includes a shaft support 230, for supporting shaft 20, a fixed base 220 and actuators, such as 226 and 228. The actuators connect the underside of shaft support 230 (not shown) to fixed base 220 and impart movement to shaft 20. The actuators, such as 226 and 228 are connected via spherical bearings such as 222 and 224, or equivalent structures such as multiple axis bearing assemblies, universal joints, ball joints, among others. These actuators drive motion base 15, synergistically, thus providing the desirable movement to shaft 20, which sets eccentric mass 10 in rotation.

FIG. 1 illustrates the instant at which the shaft support is creating a "down-hill" for mass 10. The lowest point of the inclination is indicated by radius 235, while mass 10's position is indicated by radius 240. Mass 10 will rotate "down-hill", from this beneficial position, with a maximum torque, which is generated by the gravitational forces exerted on mass 10, at this instant.

Control means (not shown), such as a programmable logic controller with sensors, monitors the dynamics of rotation of eccentric mass 10, which is slowed down by the load of the turbine, which resists rotation, such as compressor applications or electricity production (not shown). The control means provides feedback to motion base 15, which imparts optimized movements and inclinations to shaft 20 in order to have optimized forces applied on mass 10 and overcome the resistive forces of the load. At least two degrees of freedom, as mentioned above, can provide with powerful rotations.

Figure 2:
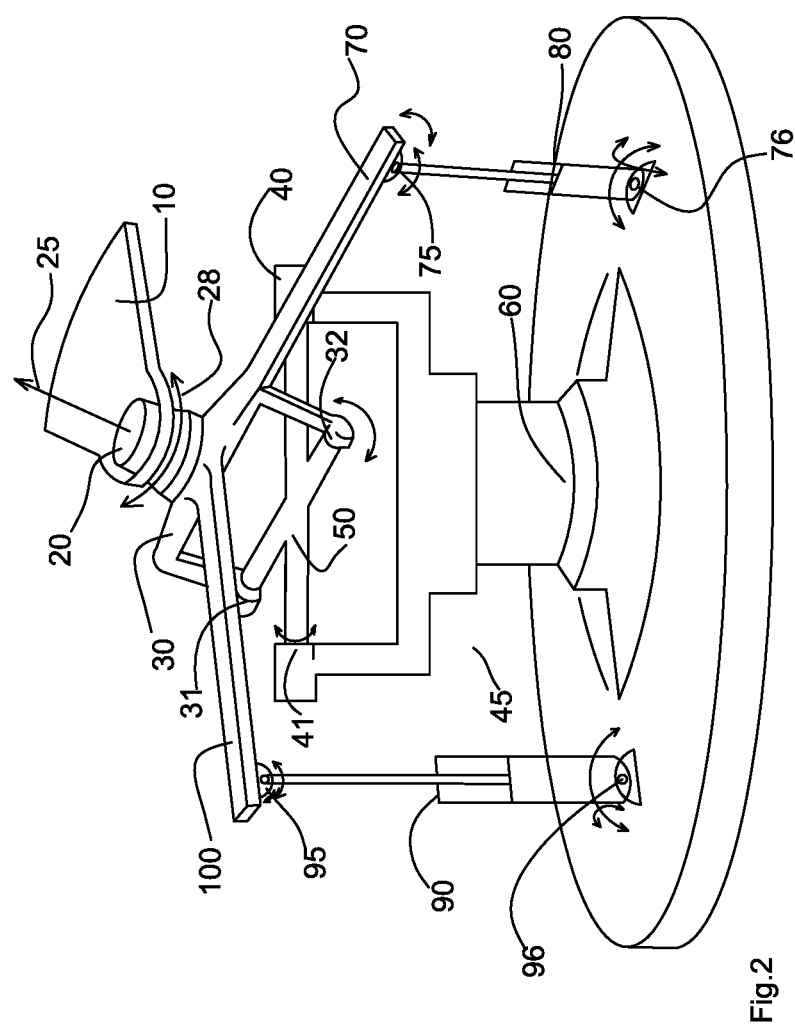
FIG. 2 shows a perspective view of a preferred embodiment of the turbine utilizing a vertical u-joint motion base.

FIG. 2 illustrates a preferred embodiment of the invention wherein motion base is the vertically oriented universal joint structure 45, which includes universal pivoting shaft support 30 and fixed pivot base 60 which are connected to each other with universal joint means, including pivoting cross 50, and actuators 80 and 90.

Universal pivoting shaft support 30 supports shaft 20. Cross 50 pivots about fixed pivot base 60 in points 40 and 41. Cross 50 also allows pivoting of universal pivoting shaft support 30 in points 31 and 32. Actuators 80 and 90 connect universal pivoting shaft support 30's extensions 70 and 100, to fixed pivot base 60, for imparting movement to universal pivoting shaft support 30 and shaft 20. Actuators 80 and 90 are connected via universal joints, 75, 76 and 95, 96, or equivalent structures such as multiple axis bearing assemblies, spherical joints, ball joints, among others.

This preferred embodiment provides movement to universal pivoting shaft support 30 in pitch and roll directions in relation to fixed pivot base 60. These rotational movements of universal pivoting support platform 30 provide universal inclinations to shaft 20, thus generating gravitational and inertial forces to mass 10, which can develop high angular velocity and momentum, thus providing powerful rotations.

Preferred embodiments of the turbine disclosed, such as the ones shown in FIG. 1 and FIG. 2 can be used in ocean applications, as well, being secured on a floating vessel, totally enclosed for protection from the sea water.

Figure 3:
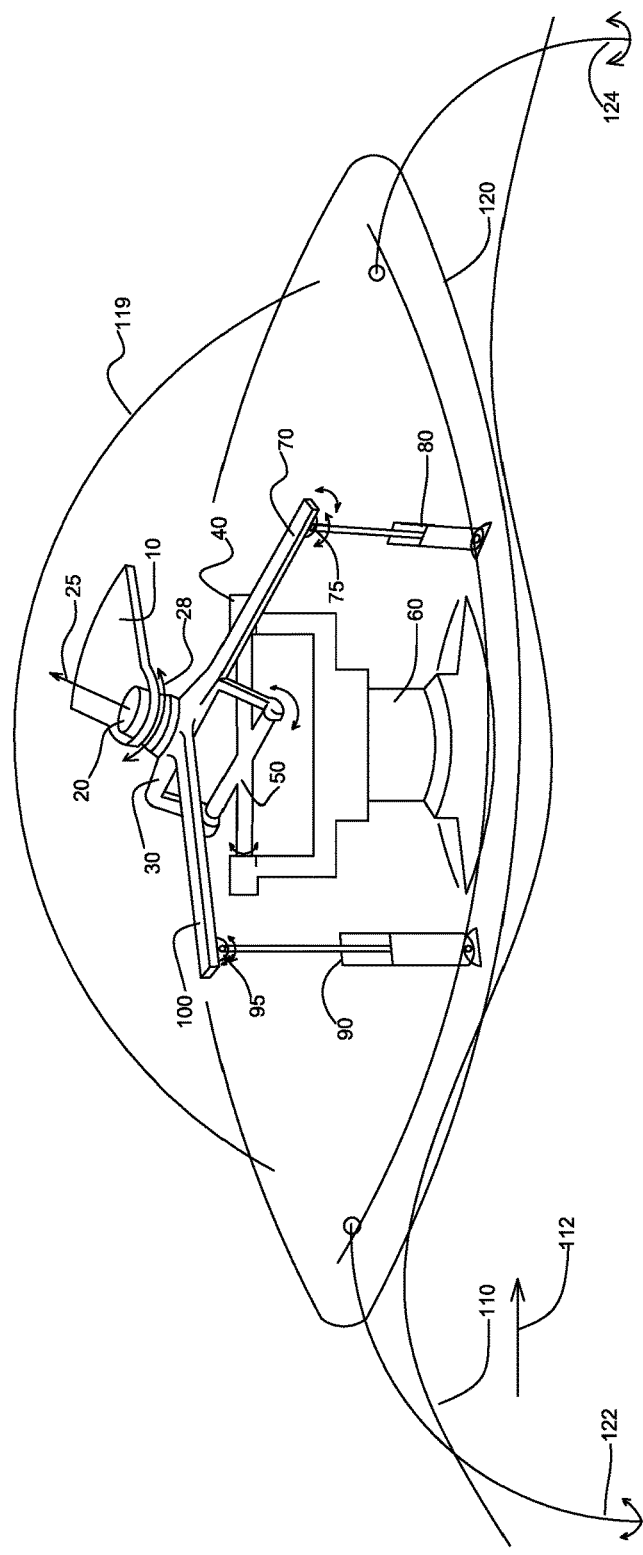
FIG. 3 shows a perspective view of a preferred embodiment of the turbine in the ocean protected from harsh conditions in a vessel.

FIG. 3 shows a preferred embodiment of the turbine operating in the ocean. It utilizes the vertically oriented universal joint structure 120, shown in FIG. 2, completely enclosed in floating vessel 120, by vessel's roof 121. Vessel 120 is disposed in ocean waves 110, which move in the direction indicated by arrow 112. The waves move vessel 20, which moves shaft 20. As a result, shaft 20 is forced to incline and mass 10 starts rotating. When an "up-hill" for mass 10 is about to occur, actuators 80 and 90, provide with an inclination, at any plane, favorable to mass 10's rotation. Another preferred embodiment uses, in addition, mooring means, such as anchors 122 and 124. Furthermore, in another preferred embodiment, control means (not shown), including sensors for predicting the parameters of the upcoming waves, disposed around vessel 120, provide feedback for optimized mass 10's rotation. Other preferred embodiments may include different shapes of vessels.

Figure 4:
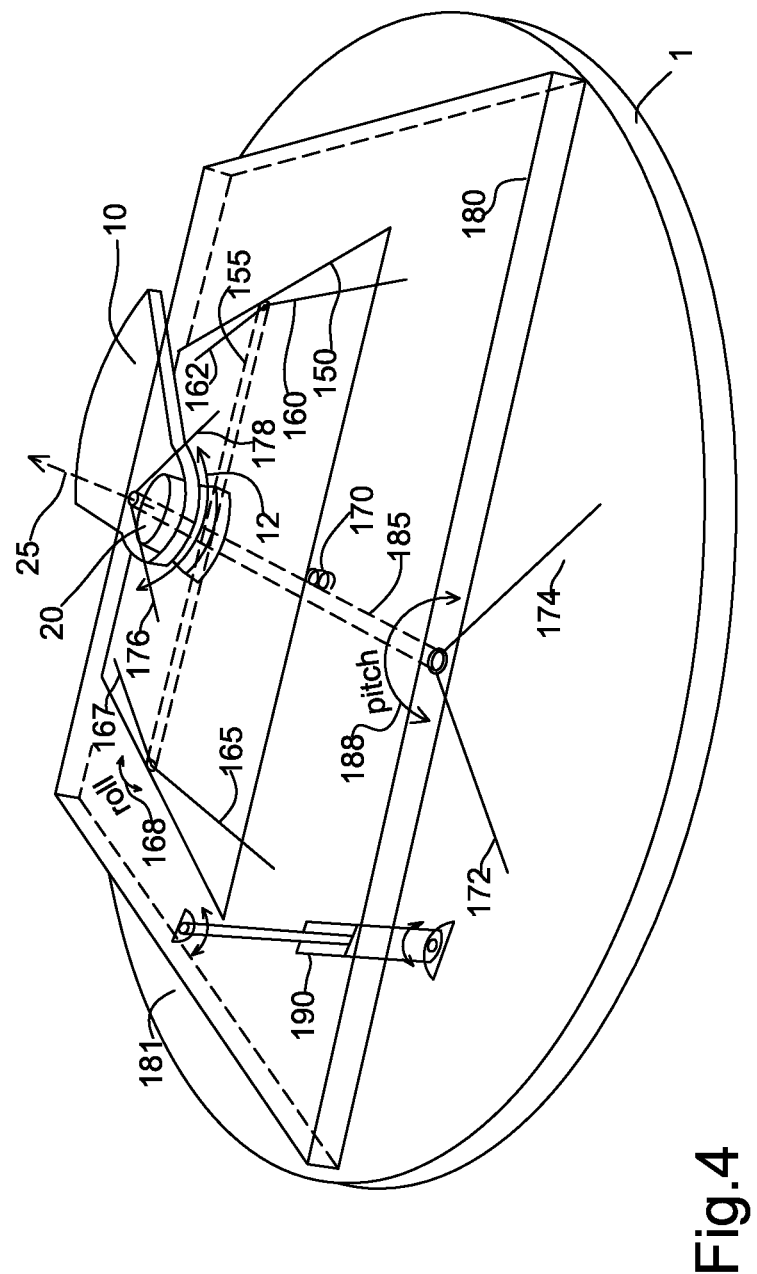
FIG. 4 shows a perspective view of a preferred embodiment of the turbine utilizing a pivoting support for the eccentrically rotating mass.

FIG. 4 illustrates another preferred embodiment of the turbine comprising pivoting platform 150, pivoting on horizontal pivot shaft 155, which is supported with pivot supports 160, 162, 165 and 167 on motion base 181. Pivoting platform 150 supports shaft 20 and eccentric mass 10. Shaft 20's main axis 25, crosses horizontal pivot shaft 155.

Motion base 181 is a one-stage motion base providing pivoting to pivoting platform 150. The position of pivoting platform 150, which supports shaft 20, depends only partially on the movement of motion base 181. That is, motion base 181 does not fully control shaft's 20 position as it was the case in the previous preferred embodiments.

Motion base 181 comprises fixed base 1, base support 180, which is pivotally supported on base pivot shaft 185, which, in turn is supported on fixed base 1 with pivot support members 172, 174, 176 and 178. Motion base 181, further comprises actuator 190. Actuator 190 is connected to fixed base 1 and the underside of base support 180 with rotational joints 192 and 194. Actuator 190 imparts rotational motion to base support 180.

Pivoting platform 150 is arranged for a limited range of pivoting motion, which stops when it reaches base support 180. Cushioning means, such as spring 170, may be used to absorb the impact of stopping.

Horizontal pivot shaft 155 is arranged to be perpendicular to base pivot shaft 185. Mass 10, in its non-operative position has pivoting platform 150 leaning on one side. When Actuator 190 starts pivoting base support 180, mass 10 begins to rotate. When mass 10 passes over horizontal pivot shaft 155, mass 10's weight pivots pivoting platform 150 on its other side. When this happens, a "down-hill" position is created for mass 10's providing maximum torque for mass 10's rotation. This "helps" mass 10 to develop angular momentum.

Another preferred embodiment (not shown) includes pivoting platform 150, pivoting on top of a motion base with more than one degree of freedom. Yet, another preferred embodiment has pivoting platform 150 pivoting on a synergistic motion base, such as the one illustrated in FIG. 1.

Figure 5:
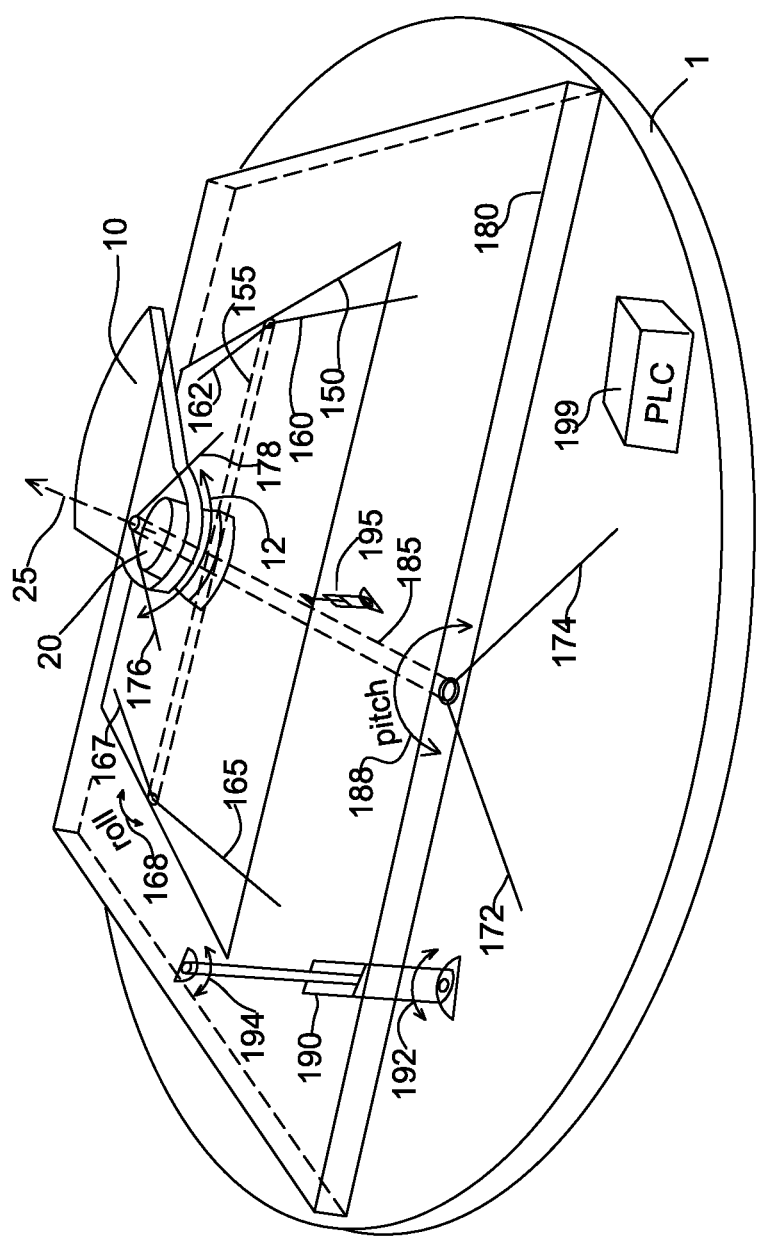
FIG. 5 shows a perspective view of a preferred embodiment of the turbine utilizing a pivot support for the eccentrically rotating mass with an actuator.

FIG. 5 shows the turbine shown in FIG. 4, further including actuator 195, connecting base support 180 to pivoting platform 150, with rotational joints. Actuator 195 optimizes mass 10's rotation, by controlling the pivoting of pivoting platform 150. Control means 199 monitor mass 10's angular momentum and controls the activation of actuators 190 and 195, in a coordinated manner to optimize mass 10's rotation.

Figure 6:
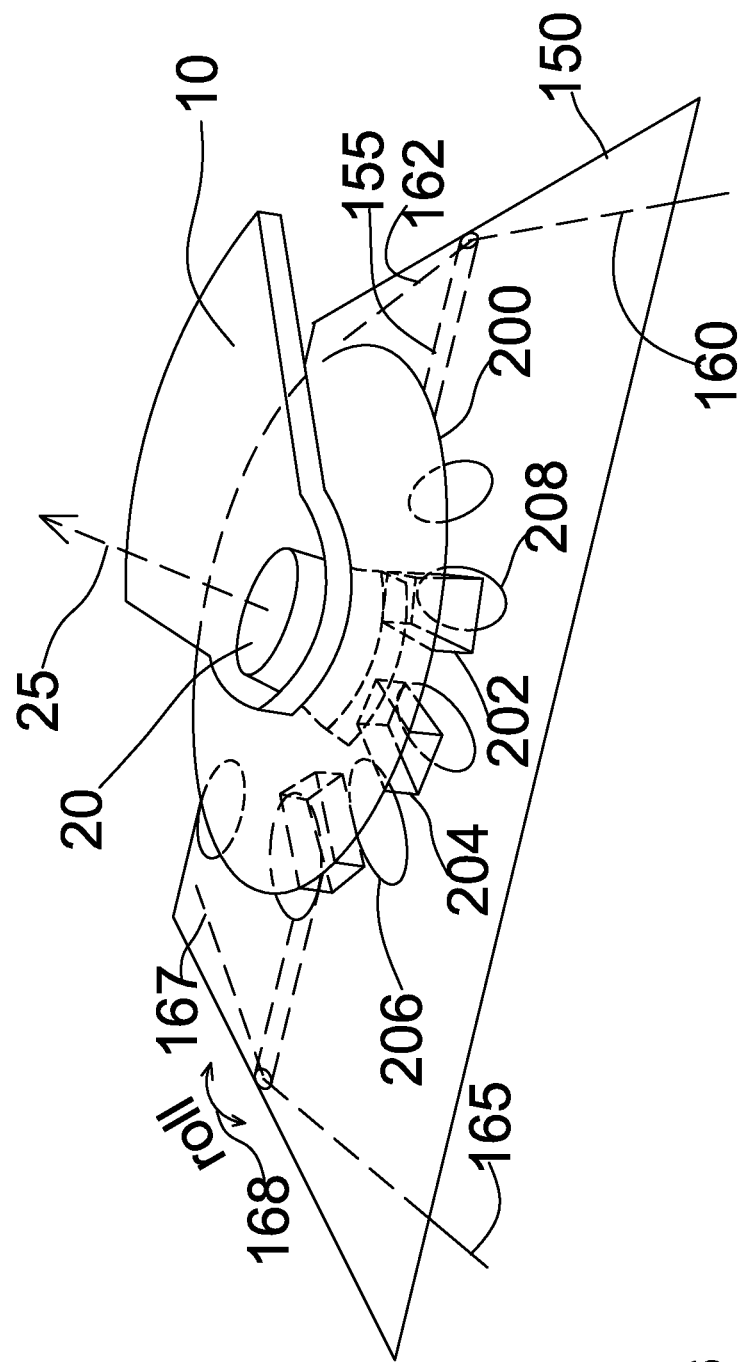
FIG. 6 shows a perspective view of an axial flux electromagnetic rotational generator used with the turbine.

FIG. 6 illustrates an electrical generator added between pivoting platform 150 and mass 10. The generator includes disc 200, which is in rotational communication with mass 10. Disc 200 has in its underside attached magnets such as 202 and 204, with proper polarity arrangement and magnetic field direction, facing coils 206, 208. The coils are supported by pivoting platform 150. When mass 10 rotates, the coils produce electricity. This is an implementation of an axial flux generator. This generator pivots along with shaft 20, in direction, 168. Other embodiments (not shown) have a stator attached on shaft 20, while having the rotor in rotational communication with the eccentric mass 10.

Figure 7:
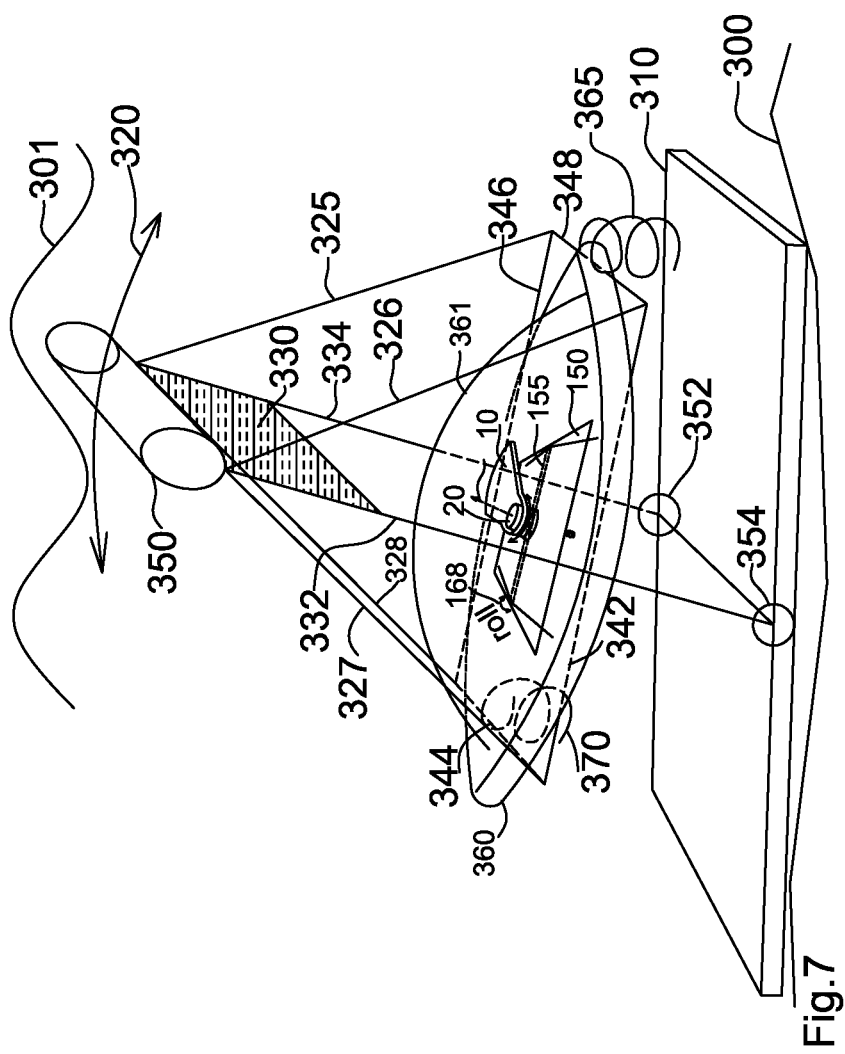
FIG. 7 shows a perspective view of a preferred embodiment of the turbine in a near-shore underwater operation.

FIG. 7 illustrates a preferred embodiment of the turbine in underwater operation, near-shore. The eccentric mass rotating mechanism is enclosed in a buoy, supported by beam means, which pivots about a horizontal pivot, provided by a fixed base in the ocean floor. More specifically, submerged buoy base 360, completely covered and protected by sea water with buoy roof 361 fully encloses all eccentric mass rotation mechanism and pivots shown in FIG. 4 (shown only partially here). Underwater fixed platform 310 is secured on the ocean floor 300. Vertical beam means such as pivoting frame comprising rods 332 and 334, is connected on the buoyant panel assembly, which here includes panel 330 and float 350. Included in the beam means, supporting frame 342, 344, 346, 348 securely supports submerged buoy base 360. Pivot points, or hinges 352 and 354, pivotally support rods 332 and 334. The buoyant panel is disposed to receive the surge motion of ocean waves 301. When ocean surge moves the buoyant panel, the beam means pivots in directions 320. Sto springs 365 and 370 may be used to provide limited range of pivoting.

This embodiment, although in different scale and environment utilizes analogous functional elements as in previous embodiments, that is: (i) a base support for the pivoting platform, shaft and rotating mass mechanism (submerged buoy base), (ii) a base pivot (beam means), (iii) a fixed base (underwater fixed platform) and (iv) an actuator (buoyant panel). The waves' surge is the prime source of power, here, as, for example, electricity powers an electric actuator.

Figure 8:
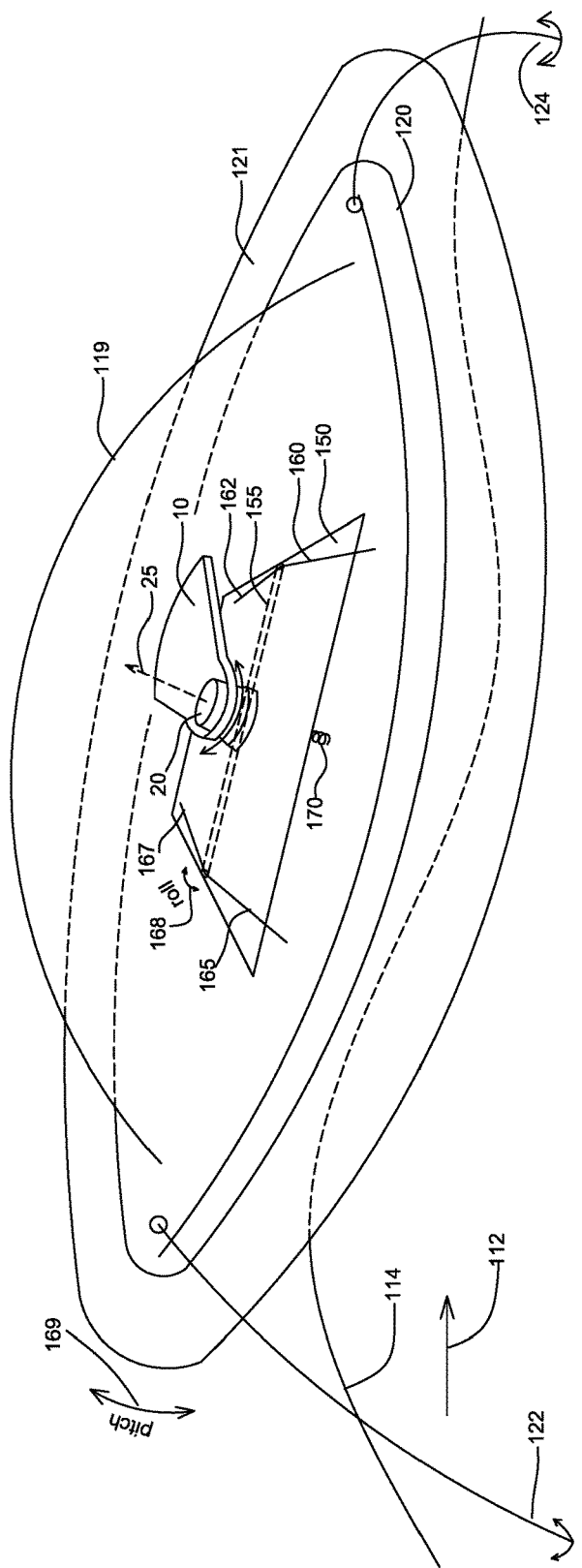
FIG. 8 shows a perspective view of a preferred embodiment of the turbine operating in the ocean utilizing a pivoting support for the eccentrically rotating mass.

FIG. 8 illustrates a preferred embodiment operating on the ocean surface. Pivoting platform 150 is pivotally supported by pivot support members 160, 162, 165 and 167, which are fixed on vessel 120, as shown. Pivoting platform 150 supports shaft 20 and mass 10, which rotates about shaft 20. Vessel 120 is moored with mooring means such as anchors 122 and 124, to maintain horizontal pivot shaft 155 substantially parallel to the direction of waves 112. Pivoting platform 150 rolls in directions 168, at a restricted range of pivoting motion limited by the vessel's floor. Cushioning means, such as spring 170 can be used to absorb the impact of platform 150's stopping, in both sides of its pivoting. Waves 114 impart pitching motion to vessel 120 in the direction 169. Vessel 120 imparts the same pitch motion to shaft 20. When the waves pitch vessel 120, mass 10 starts rotating about shaft 20. When mass 10, passes on top of horizontal pivot shaft 155, pivoting platform 150 rolls in its other side, instantly providing a "down-hill" with maximum torque for mass 10, in a direction substantially perpendicular to the direction 114 of the waves. Therefore, shaft 20 is provided with the capability of inclining towards the pitch and roll directions, in a coordinated way, so that mass 10 completes full rotations, instead of oscillations.

Roof 119 totally encloses pivoting platform 150, shaft 20 and mass 10, protecting them from sea water. In addition, a tube float such as tube float 121 can be securely attached on vessel 120's body, surrounding vessel 120, as shown in FIG.

8. Tube float 121 is used to keep vessel 120 substantially horizontal, when floating in still water.

Another embodiment further includes an actuator, similar to actuator 195, shown in FIG. 5 connecting the underside of pivoting platform 150 with vessel's floor with rotational joints and control means and sensors for monitoring wave characteristics, turbine load and mass 10's position and rotational dynamics, such as angular velocity and momentum. Control means controls the operation of actuator 195, which optimizes the pivoting angle, position and dynamics, such as speed of raising or lowering pivoting platform 150, in order to provide mass 10 an optimized rotation. Another embodiment further includes additional actuators for better stability and pivoting of pivoting platform 150. Another embodiment further includes a swivel supported on vessel 120, supporting the eccentric mass mechanism, in order to modify the alignment of pivoting platform 150, if needed, depending on the waves' direction.

The invention claimed is:

1. A turbine comprising:
  a pivoting platform pivoting about a horizontal axis, pivotally supported by a pivot;
  a shaft having a main axis perpendicular to said pivoting platform, being rigidly supported by said pivoting platform in a position where said main axis crosses said horizontal axis;
  a mass eccentrically and bearing mounted for rotation about said shaft on a rotational plane perpendicular to said shaft; said mass having a center of gravity at a distance from said shaft;
  and a motion base comprising:
  a base support pivoting about a base horizontal axis for supporting said pivot, said pivoting platform, said shaft and said mass for rotation,
  a base pivot for pivotally supporting said base support,
  a fixed base for securing said base pivot,
  at least one actuator connecting said base support to said fixed base for pivoting said base support in relation to said fixed base.

2. The turbine of claim 1 further including:
  at least one additional actuator connecting said pivoting platform to said base support for pivoting said pivoting platform in relation to said base support.

3. The turbine of claim 1 further including:
  an electrical generator having a rotor in rotational communication with said mass and a stator supported on said pivoting platform.

4. A turbine comprising:
  a pivoting platform pivoting about a horizontal axis, pivotally supported by a pivot;
  a shaft having a main axis perpendicular to said pivoting platform, being rigidly supported by said pivoting platform in a position where said main axis crosses said horizontal axis;
  a mass eccentrically and bearing mounted for rotation about said shaft on a rotational plane perpendicular to said shaft;
  said mass having a center of gravity at a distance from said shaft; and
  a motion base comprising:
  a submerged buoy base for supporting, entirely enclosed, said pivot, said pivoting platform, said shaft and said mass,
  an underwater fixed platform secured on the ocean floor, at least one pivoting hinge having a fixed end securely attached on said underwater fixed platform and a free end, being oriented to provide pivoting in a pitch direction,
  a buoyant panel disposed directly above said underwater fixed platform to receive ocean wave surge forces, and upright beam means for connecting said at least one hinge free end to said buoyant panel and securely supporting said submerged buoy base proximate to said underwater fixed platform;
  said horizontal axis is arranged to be substantially parallel to ocean wave surge,
  whereby ocean wave surge moves said buoyant panel and pivots said submerged buoy base and said shaft, causing said mass to start rotating.

5. The turbine of claim 4 further including:
  an electrical generator having a rotor in rotational communication with said mass and a stator supported on said pivoting platform.

6. A turbine comprising:
  a pivoting platform pivoting about a horizontal axis, pivotally supported by a pivot;
  a shaft having a main axis perpendicular to said pivoting platform, being rigidly supported by said pivoting platform in a position where said main axis crosses said horizontal axis;
  a mass eccentrically and bearing mounted for rotation about said shaft on a rotational plane perpendicular to said shaft; said mass having a center of gravity at a distance from said shaft;
  a floating vessel having a floor and a roof, said floating vessel being in communication with ocean waves in a direction of oncoming waves;
  said pivot being supported by said floor of said floating vessel;
  said pivoting platform being arranged for a limited range of pivoting; said roof entirely enclosing said pivoting platform, said pivot, said mass and said shaft for protection from ocean water;
  a floating tube means firmly attached to said floating vessel, for keeping said floating vessel substantially horizontal when floating in still water;
  mooring means for mooring said floating vessel in the ocean and for substantially aligning said pivoting platform horizontal axis with said wave direction, so that said floating vessel reciprocates due to said waves in a pitch motion in said wave direction, while said pivoting platform limited range of pivoting is carried out in a roll rotation;
  whereby said pitch motion inclines said vessel and said shaft, and sets said mass in said mass rotation.

7. The turbine of claim 6 further including:
  an electrical generator having a rotor in rotational communication with said mass and a stator supported on said pivoting platform.

8. The turbine of claim 6 further including:
  cushioning means for protecting said floor and said pivoting platform while pivoting.

\* \* \* \* \*